UNITED STATES PATENT OFFICE.

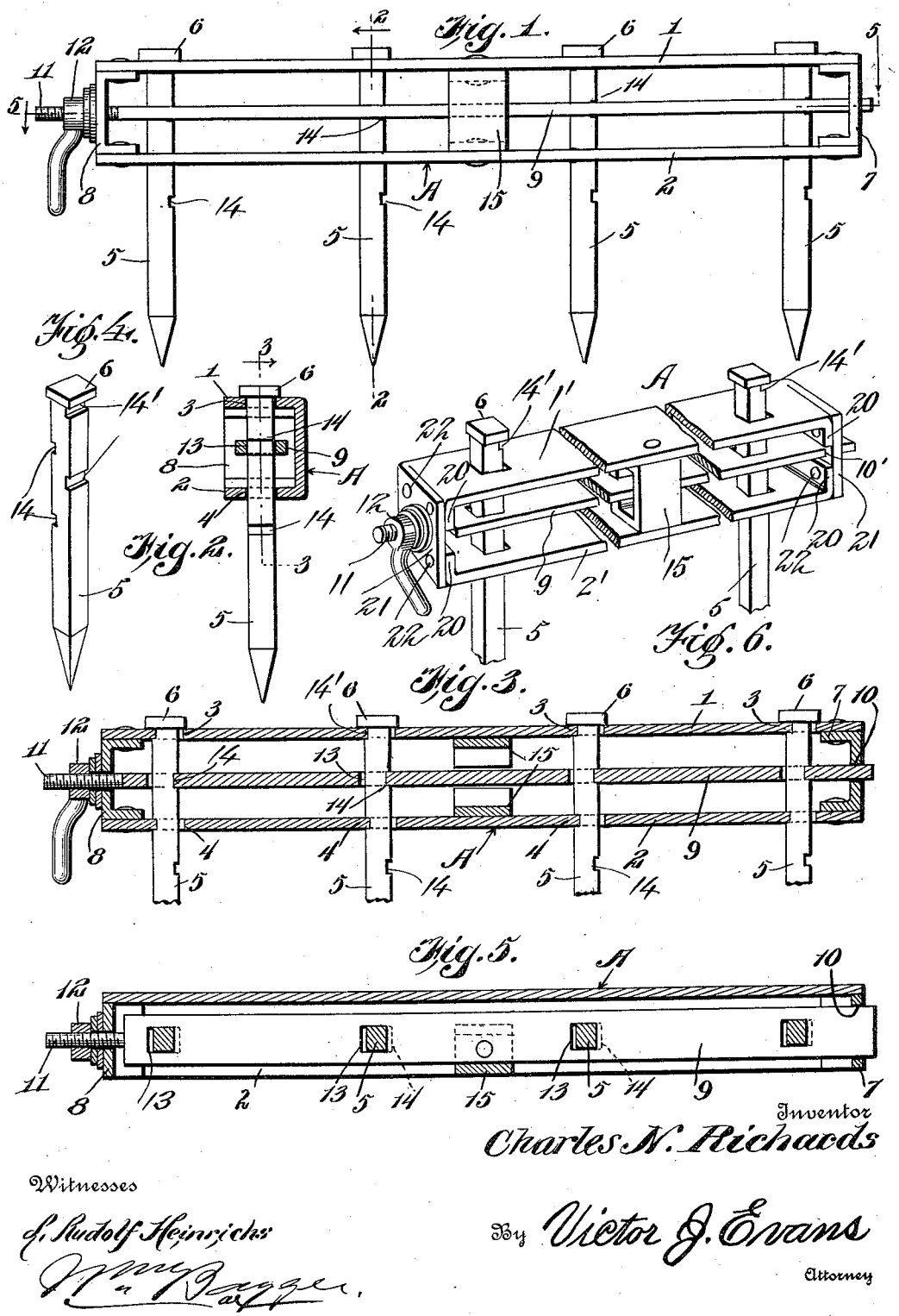

CHARLES N. RICHARDS, OF CASPER, WYOMING.

HARROW.

1,052,275.    Specification of Letters Patent.    Patented Feb. 4, 1913.

Application filed August 28, 1912. Serial No. 717,605.

*To all whom it may concern:*

Be it known that I, CHARLES N. RICHARDS, a citizen of the United States, residing at Casper, in the county of Natrona and State of Wyoming, have invented new and useful Improvements in Harrows, of which the following is a specification.

This invention relates to harrows, and it has particular reference to an improved tooth holding device.

The invention has for its object to produce a device of simple and improved construction whereby a plurality of teeth may be firmly secured in a harrow bar.

A further object of the invention is to produce a simple and efficient device for holding a plurality of teeth, said device being secured and tightened by means of a single nut.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a view in elevation of a harrow bar constructed in accordance with the invention. Fig. 2 is a vertical sectional view taken on the line 2—2 in Fig. 1. Fig. 3 is a vertical sectional view taken at right angles to Fig. 2 on the line 3—3 in Fig. 2. Fig. 4 is a perspective detail view of one of the harrow teeth detached. Fig. 5 is a horizontal sectional view taken on the line 5—5 in Fig. 1. Fig. 6 is a perspective view illustrating a modified form of the channel bar.

Corresponding parts in the several figures are denoted by like characters of reference.

The harrow bar A has been shown as consisting of a channel bar of iron or steel, and the top and bottom flanges 1 and 2 of said bar are provided at suitable intervals with registering apertures 3, 4 for the reception of the harrow teeth 5. The harrow teeth which are shown as being square in cross section are made to fit loosely in the apertures 3, 4 which are preferably of corresponding shape. The harrow teeth are also preferably provided with heads 6 adapted to rest on the top flange 1 of the harrow bar.

The harrow bar A is provided at the ends thereof with U-shaped clips 7 and 8 which are apertured for the passage of a slide 9, one end of which extends through a slot 10 in the clip 7, while the other end of said slide has a screw-threaded stem or shank 11 that projects through the clip 8 for the reception of a tail nut 12 which may be conveniently tightened thereon. The slide 9 is provided at intervals with apertures 13 for the passage of the harrow teeth, said apertures being made to register with the apertures 3, 4 in the top and bottom flanges of the harrow bar; the contour of the apertures 13 is also made to correspond with the contour of the apertures 3, 4.

Each of the harrow teeth 5 is provided near its upper end with notches or grooves 14, 14′, said notches being formed in opposite sides of the said teeth, as will be clearly seen in Fig. 4 of the drawings. It will be readily seen that when the slide 9 is so positioned that the apertures 13 therein will register with the apertures 3, 4 in the harrow bar, the teeth may be readily dropped into position through the several registering apertures; the grooves 14 in one side of the harrow teeth being turned away from the end of the slide which has the threaded extension or shank, said grooves being adapted to be engaged by the slide itself, while the grooves 14′ in the opposite side of each harrow tooth are placed in registry with the top and bottom flanges of the channel bar. After the teeth have been dropped in position where they are retained by the head 6 resting on the top flange of the harrow bar, the nut 12 is tightened, thus moving the slide laterally until the notches 14 of the several teeth are engaged by the proximate walls of the aperture 13, while the notches 14′ are engaged by the proximate walls of the apertures 3, 4. The several apertures having been formed to register, as described, it is obvious that by tightening the nut the several teeth will collectively and individually be tightened in position where they are, moreover, securely retained by the grooves 14 being engaged by the slide, and the grooves 14′ by the channel bar.

In Fig. 6 of the drawing has been illustrated a modified construction of the channel bar under which the top and bottom flanges 1', 2' of said bar are provided at the ends thereof with lugs 20; the body portion or web of each channel bar is also provided at each end with a bracket portion 21 which is bent substantially at right angles thereto and which is secured on the lugs 20 by fastening means, such as rivets 22. One of these bracket members is provided with a slot 10' for the passage of the slide 9 which is provided with a screw threaded shank 11 projecting through an aperture in the opposite bracket portion, the construction and arrangement of the slide being exactly similar to that previously described. The construction and arrangement of the harrow teeth is likewise identical with that previously described, the only difference being in the structure of the channel bar which, it will be seen, may be manufactured from a single piece of stock.

By this invention the harrow teeth may be quickly and easily removed from the harrow bar for sharpening or other purposes, by simply loosening the tail nut 12, and after being sharpened they may be quickly and securely replaced. No parts of the device are liable to become displaced or lost, and the entire device is simple in construction and inexpensive. The harrow bar may be reinforced intermediate the ends thereof by an auxiliary clip, as shown at 15, said auxiliary clip forming also a guide for the slide.

Having thus described the invention, what is claimed as new, is:—

1. In a device of the class described, a channel bar, the top and bottom flanges of which have registering perforations, clips at the ends of the bar, a slide having at one end a threaded shank, said slide and shank being guided through the clips at the ends of the harrow bar and said slide being provided with apertures registering with the apertures in the top and bottom flanges of the harrow bar, teeth extending through the registering apertures in the top and bottom flanges of the harrow bar and in the slide, said teeth having heads resting on the top flange of the bar, and a tail nut on the threaded shank of the slide.

2. In a device of the class described, a channel bar, the top and bottom flanges of which have registering perforations, clips at the ends of the bar, a slide having at one end a threaded shank, said slide and shank being guided through the clips at the ends of the harrow bar and said slide being provided with apertures registering with the apertures in the top and bottom flanges of the harrow bar, teeth extending through the registering apertures in the top and bottom flanges of the harrow bar and in the slide, said teeth having heads resting on the top flange of the bar, and a tail nut on the threaded shank of the slide; said teeth being provided near their upper ends with notches engaged by the proximate side walls of the apertures in the slide.

In testimony whereof I affix my signature in presence of two witnesses.

CHARLES N. RICHARDS.

Witnesses:
F. H. SAWYER,
FRED E. PLACE.

Copies of this patent may be obtained for five cents each, by addressing the "Commissioner of Patents, Washington, D. C."